United States Patent [19]
Bennett

[11] 3,840,264
[45] Oct. 8, 1974

[54] SWIVEL JOINT
[76] Inventor: David F. Bennett, 110 Fleetwood Ave., Daytona Beach, Fla. 32014
[22] Filed: Mar. 20, 1973
[21] Appl. No.: 342,970

[52] U.S. Cl. .................. 285/98, 285/190, 285/351
[51] Int. Cl. ........................................... F16l 17/02
[58] Field of Search ............ 285/98, 281, 190, 351, 285/134

[56] References Cited
UNITED STATES PATENTS

| 2,489,441 | 11/1949 | Warren | 285/98 |
| 2,812,960 | 11/1957 | Walsh | 285/98 X |
| 3,442,539 | 5/1969 | Randall | 285/190 |
| 3,552,781 | 1/1971 | Helland | 285/351 X |

FOREIGN PATENTS OR APPLICATIONS

| 41,801 | 8/1925 | Norway | 285/190 |
| 1,013,476 | 8/1957 | Germany | 285/190 |

Primary Examiner—Jordan Franklin
Assistant Examiner—Moshe I. Cohen
Attorney, Agent, or Firm—John N. Randolph

[57] ABSTRACT

A swivel joint forming a connection between two conduit sections disposed at a right angle to one another for providing a balanced arrangement between the two rotatively connected sections of the joint to provide a leak-proof connection having maximum stability assuring free rotation between the joint sections with a minimum amount of friction or binding.

5 Claims, 2 Drawing Figures

SWIVEL JOINT

SUMMARY

It is a primary object of the present invention to provide a joint capable of forming a leak-proof connection between two conduit sections disposed at a right angle to one another, enabling a first one of said conduit sections to oscillate or rotate freely about the axis of the other section and permitting the second or other conduit section to revolve freely about its own axis.

Another object of the invention is to provide a swivel joint including a body member having a port for connection to one section of a conduit and which is so located in spaced apart relation to the ends of said body member as to afford free rotation and increased stability.

A further object of the invention is to provide a swivel joint with novel means for sealing the joint sections to prevent leakage.

Various other objects and advantages of the invention will hereinafter become more fully apparent from the following description of the drawing, illustrating a presently preferred embodiment thereof, and wherein:

DESCRIPTION OF THE PREFERRED EMBODIMENT

Figure 1:
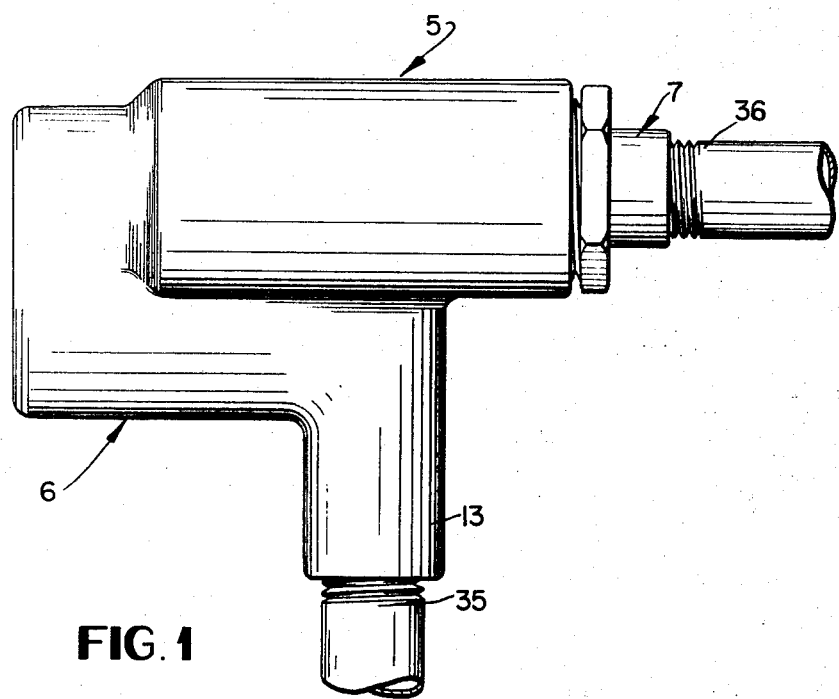
FIG. 1 is a side elevational view showing the swivel joint connected to adjacent ends of two conduit sections.
Figure 2:
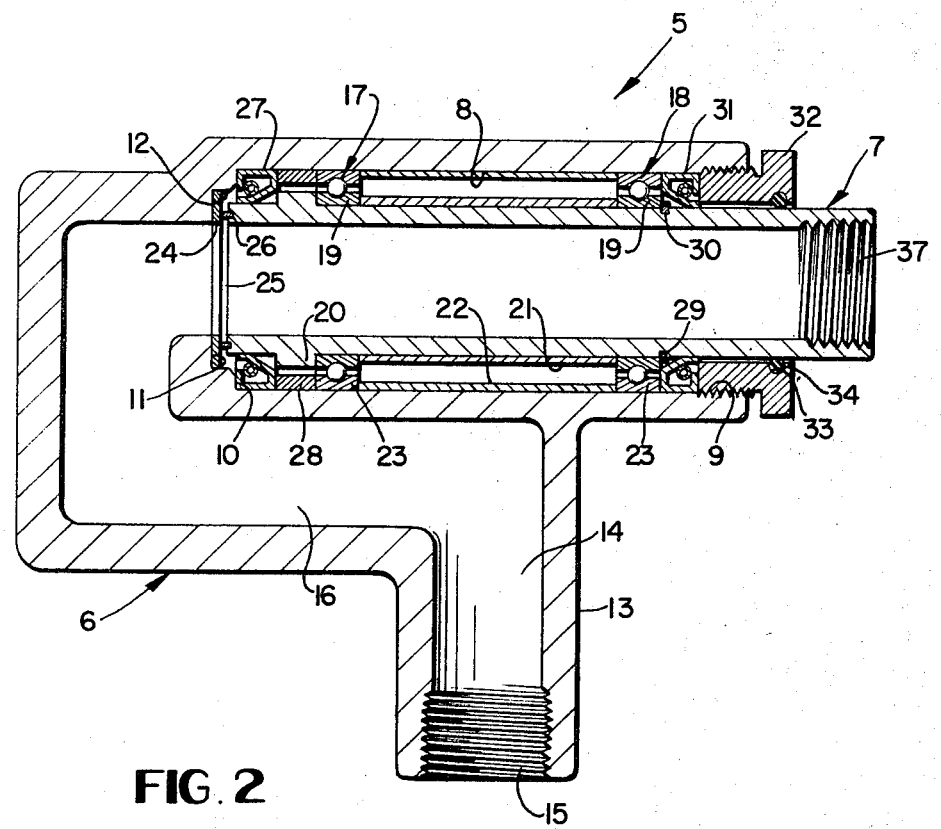
FIG. 2 is an enlarged sectional view taken substantially midway between the corresponding opposite sides of the swivel joint.

Referring more specifically to the drawing, the swivel joint in its entirety and comprising the invention is designated generally 5 and includes a section 6 and a section 7.

The section 6 comprises an elongated body member in the form of a single casting having a longitudinally extending bore 8 which opens outwardly at one end thereof. An outer open end of the bore 8 is internally threaded as seen at 9. The other end of the bore 8 is stepped to provide annular shoulders 10 and 11 which face toward the open end 9 of said bore and which are separated from one another by an annular restricted portion 12. The body member 6 has a laterally projecting tubular portion 13 which is spaced from the ends thereof, providing a bore 14 the open end of which is internally threaded as seen at 15. A bore or passage 16 of the body 6 extends between an inner end of the bore 8 and the inner end of the bore 14.

The swivel section 7 comprises a tube which is disposed in the bore 8 and supported for free rotation therein by two ball bearings 17 and 18 which are disposed in spaced apart relation to one another. The inner race 19 of the ball bearing 17, which is located remote from the threaded bore end 9, abuts against an annular enlargement 20 of the tube 7. An inner spacer sleeve 21 is disposed around an intermediate portion of the tube 7 and has its ends abutting against the inner races 19 of the ball bearings 17 and 18. An outer spacer sleeve 22 lines a portion of the bore 8 and abuts the outer races 23 of the ball bearings 17 and 18, to cooperate with the sleeve 21 in maintaining the ball bearings spaced from one another.

A washer-like wear ring 24 bears against and lines the shoulder 11. One annular edge of a ring seal 25 seats in an annular groove 26 which opens outwardly of the inner end of the tube 7. The other annular edge of the seal 25 bears against the exposed face of the wear ring 24 to prevent leakage between said inner end of the tube 7 and the wear ring.

A secondary annular seal 27 is disposed around the inner end of the tube 7 and is retained against the shoulder 10 by a spacer ring 28 which bears against said seal and against the other side edge of the outer ring 23 of the ball bearing 17.

A snap ring 29 seats in an annular outwardly opening groove 30 of the tube 7 and bears against the other side edge of the inner race 19 of ball bearing 18 to combine with the enlargement 20 for retaining the ball bearings 17 and 18 in predetermined spaced apart relation to one another. Another annular seal 31, corresponding to the seal 27, is disposed within the bore 8, around the tube 7 and bears against the other side edge of the outer race 23 of ball bearing 18 and is retained thus disposed by a nut 32, which is disposed around the tube 7 in threaded engagemnet with the bore portion 9 and with its inner end abutting the seal 31. The bore of the nut 32, near its outer end, has an annular groove 33 to accommodate an outer portion of an O-ring 34 which contacts an annular exterior portion of the tube 7 to prevent contamination entering the swivel 5 between the nut 32 and tube 7.

An externally threaded end 35 of one section of a conduit threadedly engages in the bore portion 15 and an externally threaded end 36 of an adjacent section of said conduit, and which is disposed at a right angle to the section 35, threadedly engages internally threaded outer end 37 of the tube 7 for interposing the swivel 5 in the conduit 35,36.

Ball bearings 17 and 18 permit the swivel section 7 to rotate freely in the swivel section 6 so that the conduit section 35 may oscillate or revolve freely with the swivel section 6 relative to the swivel section 7 and conduit 36, or the conduit 36 and swivel section 7 may rotate about their axis relative to the swivel section 6 and conduit 35. The ball bearings 17 and 18 are confined between the enlargement 20 and the snap ring 29 and are maintained against displacement toward one another by the sleeves 21 and 22 to mount the swivel section 6 for free rotation or oscillation on the swivel section 7. The axis of the bore 14 and conduit 35 is disposed substantially midway between the bearings 17 and 18 to provide a balanced arrangement to minimize any tendency of the section 6 to bind relative to the section 7.

Various modifications and changes are contemplated and may be resorted to, without departing from the function or scope of the invention.

I claim as my invention:

1. A swivel joint comprising an elongated body member constituting one swivel section having an enlarged portion and a restricted end, said body member having a first bore provided with an outer end opening through said restricted end and an inner end disposed adjacent the other end of the body member, said body member having a second angular bore disposed in said enlarged portion including a short leg disposed crosswise of the body member and connecting with said inner end of the first bore and a long leg connected to said short leg and disposed parallel to said first bore, said body member having a laterally projecting extension formed in said enlarged portion and remote from said short leg of the second bore, said extension defining a third bore having an outwardly opening outer end and an inner end communicating with said long leg of the second bore remote from said short leg; an open ended tube constituting said other swivel section, anti-friction bearings rotatably mounting said tube in said first bore, means mounted on the exterior of the tube and between which the bearings are confined, spacer means disposed in said first bore around said tube and extending between the bearings, said body member defining a restriction at said inner end of said first bore forming an abutment for the inner end of the tube, and means detachably secured in the outer end of the first bore for sealing the bore around said tube and cooperating with said first mentioned means, the spacer means, said bearings and the restriction to retain the tube against longitudinal movement in said first bore and with said bearings disposed on opposite sides of and substantially equally spaced from the axis of said third bore.

2. A swivel joint as in claim 1, said first mentioned means comprising an integral enlargement, an outwardly opening groove and a ring detachably mounted in said groove.

3. A swivel joint as in claim 1, said spacer means comprising an inner sleeve having a close fitting engagement around the tube and an outer sleeve lining a portion of the first bore.

4. A swivel joint as in claim 1, said last mentioned means comprising a nut threadedly engaging in the first bore and having an sealing member engaging said tube.

5. A swivel joint as in claim 1, and means providing a seal between said first bore and said inner end of the tube.

* * * * *